(12) United States Patent
Cai et al.

(10) Patent No.: US 11,380,108 B1
(45) Date of Patent: Jul. 5, 2022

(54) SUPPLEMENTING TOP-DOWN PREDICTIONS WITH IMAGE FEATURES

(71) Applicant: Zoox, Inc., Foster City, CA (US)

(72) Inventors: Tianyi Cai, Palo Alto, CA (US); James William Vaisey Philbin, Palo Alto, CA (US); Kai Zhenyu Wang, Foster City, CA (US)

(73) Assignee: Zoox, Inc., Foster City, CA (US)

(*) Notice: Subject to any disclaimer, the term of this patent is extended or adjusted under 35 U.S.C. 154(b) by 397 days.

(21) Appl. No.: 16/586,646

(22) Filed: Sep. 27, 2019

(51) Int. Cl.
| | | |
|---|---|---|
| *G06V 20/58* | (2022.01) | |
| *G06K 9/62* | (2022.01) | |
| *G06N 5/04* | (2006.01) | |
| *G06N 20/00* | (2019.01) | |
| *G05D 1/00* | (2006.01) | |
| *G05D 1/02* | (2020.01) | |

(52) U.S. Cl.
CPC .......... *G06V 20/58* (2022.01); *G05D 1/0088* (2013.01); *G05D 1/0221* (2013.01); *G06K 9/6262* (2013.01); *G06N 5/04* (2013.01); *G06N 20/00* (2019.01); *G05D 2201/0213* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,169,678 | B1* | 1/2019 | Sachdeva | H04N 13/361 |
| 10,671,878 | B1* | 6/2020 | Sarshogh | G06V 10/25 |
| 2018/0173971 | A1* | 6/2018 | Jia | G06N 3/084 |
| 2019/0286921 | A1* | 9/2019 | Liang | G06F 16/587 |
| 2020/0026960 | A1* | 1/2020 | Park | G05D 1/0077 |
| 2020/0082248 | A1* | 3/2020 | Villegas | G05D 1/0223 |
| 2020/0134844 | A1* | 4/2020 | Mittal | G06N 20/00 |
| 2020/0210769 | A1* | 7/2020 | Hou | G06N 20/20 |
| 2021/0004611 | A1* | 1/2021 | Garimella | G05B 13/0265 |

OTHER PUBLICATIONS

Stéphanie Lefèvre,"A survey on motion prediction and risk assessment for intelligent vehicles",Jul. 23, 2014, ROBOMECH Journal 2014, 1:1 http://www.robomechjournal.com/content/1/1/1, pp. 1-10.*

(Continued)

*Primary Examiner* — Omar S Ismail

(74) *Attorney, Agent, or Firm* — Lee & Hayes, P.C.

(57) ABSTRACT

The described techniques relate to predicting object behavior based on top-down representations of an environment comprising top-down representations of image features in the environment. For example, a top-down representation may comprise a multi-channel image that includes semantic map information along with additional information for a target object and/or other objects in an environment. A top-down image feature representation may also be a multi-channel image that incorporates various tensors for different image features with channels of the multi-channel image, and may be generated directly from an input image. A prediction component can generate predictions of object behavior based at least in part on the top-down image feature representation, and in some cases, can generate predictions based on the top-down image feature representation together with the additional top-down representation.

19 Claims, 6 Drawing Sheets

(56) References Cited

OTHER PUBLICATIONS

Hong Cheng,"Interactive Road Situation Analysis for Driver Assistance and Safety Warning Systems:Framework and Algorithms," Feb. 26, 2007, IEEE Transactions on Intelligent Transportation Systems, vol. 8, No. 1, Mar. 2007, pp. 157-165.*

Sayanan Sivaraman,"Looking at Vehicles on the Road: A Survey of Vision-Based Vehicle Detection, Tracking, and Behavior Analysis," Jul. 18, 2013, IEEE Transactions on Intelligent Transportation Systems, vol. 14, No. 4, Dec. 2013, pp. 1773-1787.*

Yan Wang,"Pseudo-LiDAR from Visual Depth Estimation: Bridging the Gap in 3D Object Detection for Autonomous Driving," Jun. 2019,Proceedings of the IEEE/CVF Conference on Computer Vision and Pattern Recognition (CVPR),2019, pp. 8445-8452.*

Tao Deng,"Where Does the Driver Look? Top-Down-Based Saliency Detection in a Traffic Driving Environment," Mar. 25, 2016, IEEE Transactions on Intelligent Transportation Systems, vol. 17, No. 7, Jul. 2016,pp. 2051-2060.*

* cited by examiner

US 11,380,108 B1

SUPPLEMENTING TOP-DOWN PREDICTIONS WITH IMAGE FEATURES

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. A variety of sensors may be used to collect information about objects in the surrounding environment, which may be used by the autonomous vehicle to make decisions on how to traverse the environment. Accurately predicting object behavior in the environment may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
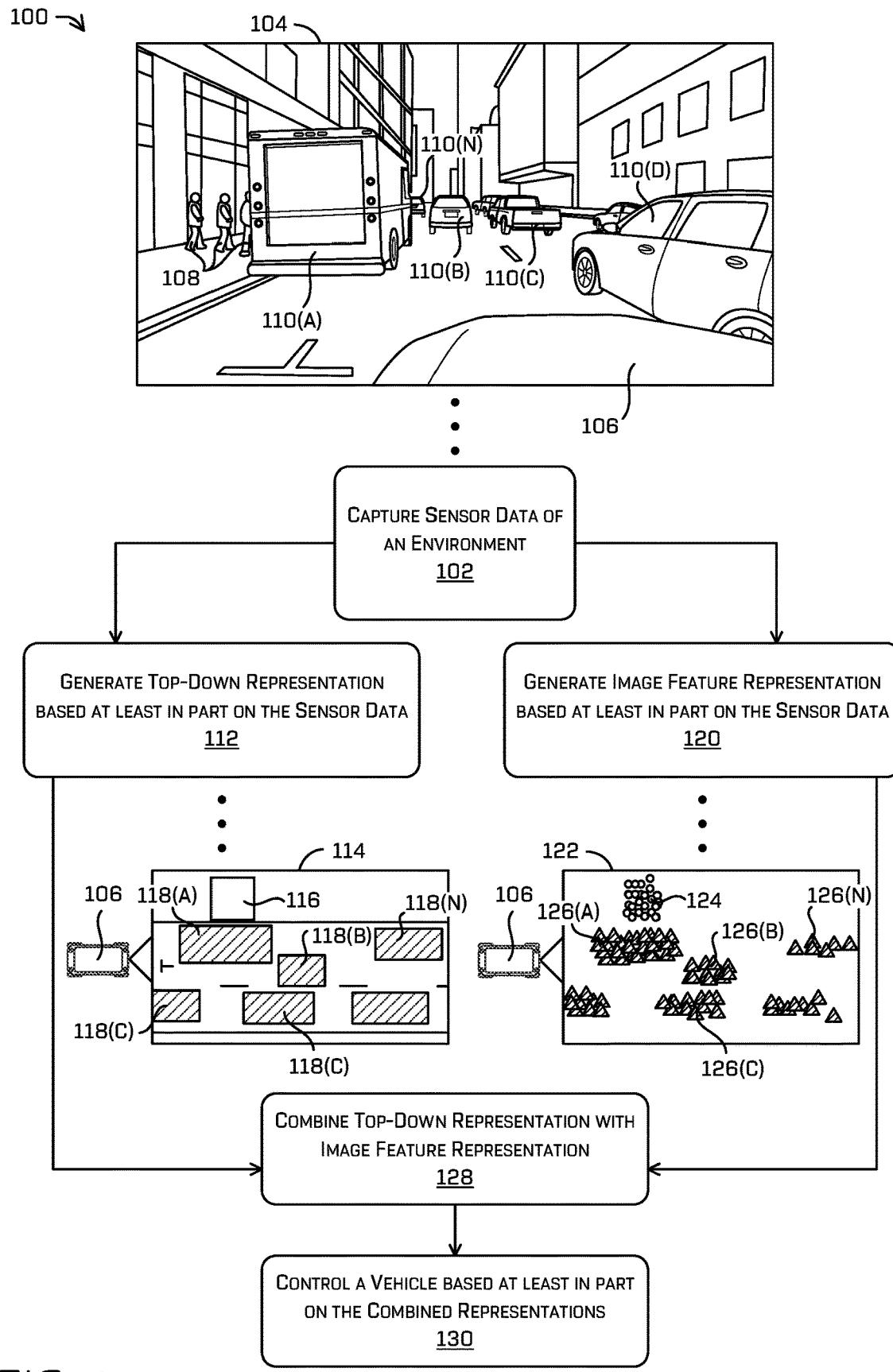
FIG. 1 is a pictorial flow diagram of generating a top-down representation and an image feature representation based on sensor data of an environment, combining the top-down representation with the image feature representation, and controlling a vehicle based at least in part on the combined representations, in accordance with examples of the disclosure.

This disclosure relates to generating predictions of object behavior based on top-down representations of an environment. In examples, an image may be used to generate a top-down image feature representation, and the top-down image feature representation may be concatenated with a top-down representation generated using additional sensor data (e.g., lidar, radar, time of flight, and the like) to generate and/or improve the predictions of object behavior. In some examples, a vehicle such as an autonomous vehicle may utilize a variety of sensor modalities and algorithms to predict behaviors of objects in an environment surrounding the autonomous vehicle. Predicted behaviors of objects can then be used to generate and refine the autonomous vehicle's trajectory as the autonomous vehicle proceeds through the environment. Some examples of generating and/or refining an autonomous vehicle's trajectory may include determining a speed to proceed through the environment, determining when and/or how fast to stop, determining a lane for the autonomous vehicle to use to proceed through the environment, and so forth.

In some examples, sensor data captured by sensors of the autonomous vehicle may be used to generate a multi-channel representation (also referred to herein as a "multi-channel image" or simply "image"), encoding various parameters of the object(s) and/or of the environment in various channels of the "image." A channel of the multi-channel image may be represented in the multi-channel image by a pixel, or multiple pixels, of the multi-channel image. In some examples, the multi-channel representation may be encoded in a top-down view (referred to herein as a "top-down representation"). The top-down representation may be generated based on sensor data, map data, and/or action data. The sensor data can be used to generate one or more channels of the multi-channel image of the top-down representation, representing a bounding box and velocity information associated with the object, map data, and other semantic information (e.g., speed limits, lane widths, lane ends, stop lines, traffic lights, traffic light states, and the like). Action data can be used to generate one or more channels of the multi-channel image of the top-down representation representing a target lane, trajectory, etc. of the autonomous vehicle (which may, for example, correspond to actions including the vehicle proceeding through an intersection, changing lanes, making a turn, or the like).

For a vehicle (e.g., an autonomous vehicle or an autonomous robot) to drive safely through an environment, it may make predictions about the behavior of other objects in the world. For instance, the autonomous vehicle can pass through the environment safely if it can accurately determine whether to yield to an oncoming object or not. In some examples, the techniques discussed herein may include conditioning prediction probabilities (e.g., a heat map) on planned behavior (which may be represented as action data) of the autonomous vehicle. By conditioning the heat map on the planned behavior of the autonomous vehicle, techniques discussed herein can include minimizing the multi-modality of the predicted heat map. That is, the predictions of future states of objects in an environment can be based on candidate actions proposed to be performed by the autonomous vehicle and such predictions may comprise improved predictions with respect to the additional objects. The output of a machine learned model can be used by a planning system to determine a cost function based on the heat map output and search for an optimal (or otherwise acceptable) action for the autonomous vehicle that minimizes the cost (or maintains the cost below an acceptable threshold) on the prediction probabilities output. Additional details regarding prediction(s) based on action data using a heat map may be found in U.S. patent application Ser. No. 16/504,147, which is incorporated by reference herein in its entirety.

While top-down representations of the environment as just described provide a variety of information about the surrounding environment to an autonomous vehicle, in some cases, additional information about objects in the environment can be provided by incorporating feature data from additional sensor modalities (e.g., image data from image sensors) which is otherwise unable to be incorporated in such a top-down representation.

Therefore, the described techniques supplement predictions using top-down representations as determined from image data by giving a machine-learned model access to the image data to generate a corresponding top-down representation of image features. In this way, the machine-learned model may "learn" features that are important to predicting object behavior from the image features, without requiring that the features be enumerated beforehand. Further, the machine-learned model may learn features that are not important (or are less important) to predicting object behavior, and forego analysis of such features, or give such features less weight when predicting object behavior.

In some examples, a machine-learned model may be trained to incorporate image data into top-down predictions using stored log data as training data. For instance, a behavior of an object in an environment (e.g., a car changing lanes, a pedestrian crossing a street, a bicycle turning at a junction, etc.) subsequent to a time of a captured image may have previously been determined based on sensor data. Sensors of a vehicle may track the object over time, and record the sensor data of the object's behavior in log data. This log data may then be used as ground truth to describe the actual behavior of the object that correspond to the image data, which can be used to train the machine-learned model to predict object behavior based on similar image data captured in the future.

Additionally, in some cases, an image may be received depicting an object in the environment. At least a portion of the image may be input into a machine-learned model to analyze features of the object in the image data. The machine-learned model may output a multi-channel representation that corresponds to the image (or the portion of the image) from a top-down perspective, that is generated by inputting the image itself into to the machine-learned model that outputs a top-down representation of such image features. In this case, the multi-channel representation may comprise image features of the image that was input into the machine-learned model, e.g., encoded based on sensor data, map data, and/or action data as described above.

In some examples, the top-down multi-channel representation generated using the image may be combined (e.g., concatenated) with a top-down, multi-channel representation generated from other sensor data corresponding to the environment at a same or similar time to the time the image was captured. For instance, probabilities of a particular behavior of an object depicted in the multi-channel image may be combined with top-down representations as determined by additional sensor modalities (lidar, radar, etc.) and/or additional data sources (map data indicating lane positions, stopping positions, and the like), e.g., channel-to-channel of the respective multi-channel images. The machine-learned model may use the multi-channel representations, as combined, to generate a prediction of a behavior of the object.

Whether combined with a top-down representation or otherwise, a difference between the predicted behavior of the object may be compared to the actual behavior of the object, e.g., from log data, to determine an accuracy of the prediction of the object's behavior by the machine-learned model. Based on the difference between the predicted behavior of the object and the actual behavior of the object, one or more parameters of the machine-learned model may be altered to minimize the difference. For instance, one or more parameters of the machine-learned model may be altered to more accurately predict behavior of the object based on the multi-channel representation corresponding to the image itself. Alternatively or additionally, one or more parameters of the machine-learned model may be altered after the multi-channel images are concatenated to more accurately predict behavior of the object.

Supplementing top-down predictions using image features may be used to control a vehicle, such as an autonomous vehicle, as well. For example, as the vehicle traverses an environment, the vehicle may capture an image (or a portion of an image) and may input the image into a first portion of a machine-learned model trained to output a top-down image feature representation from the image and/or to detect image features. An image feature associated with the object may be received from the machine-learned model (e.g., as part of a top-down image feature representation), where the image feature may correspond to a channel of a multi-channel representation of the image. For instance, the image feature may represent a likelihood that the object will change lanes, enter into a drivable region, exit a drivable region, make a turn, etc.

Additionally, in some examples, a multi-channel image representing a top-down view of the environment may be generated using additional sensor data (e.g., substantially simultaneously to the image feature being received). The multi-channel image may include a top-down feature of the object, which may be based on the additional sensor data. In some examples, the top-down feature may be the same feature as the image feature, a similar feature to the image feature, or may be a different feature from the image feature. Similar to the discussion above, features included in the top-down representation may represent a likelihood that the object will change lanes, enter into a drivable region, exit a drivable region, make a turn, etc. The image feature(s) and top-down feature(s) may be the same or different types of features and/or may be associated with the same or different objects.

In examples, the vehicle may concatenate, as a concatenated representation, the image feature representation and the top-down representation. For instance, the concatenated representation may be generated by concatenating corresponding channels of the image feature representation with the top-down representation, such that information from each representation is included in the concatenated representation. In other words, the concatenated representation may comprise concatenated data from the image feature representation and the top-down representation. The concatenated representation may be input into a second portion of the machine-learned model trained to predict object behavior, and a predicted behavior of the object may be received from the model. In some cases, the second portion of the machine-learned model may alter the likelihood of the predicted behavior as determined according to the top-down representation to include information from the image feature representation, based on parameters of the model. For instance, the second portion of the machine-learned model may increase or decrease a likelihood, determined according to the multi-channel top-down representation, of the object executing a behavior based on the image feature representation output by the first portion of the machine-learned model. The predicted behavior may be used in controlling the autonomous vehicle, e.g., by altering a trajectory to accommodate the predicted behavior of the object.

The techniques discussed herein can improve a functioning of a computing device in a number of ways. For instance, the machine-learned model may use as few as a single image or single video frame to make reliable behavior predictions of objects in the environment surrounding a vehicle. Consequently, significantly less processing resources are used in comparison to conventional techniques that require complex image analysis algorithms applied to sequences of multiple images to predict a behavior of an object. Further, conventional techniques that predict object behavior often require multiple observations (e.g., multiple images or video frames), and thus these conventional techniques have higher latency than the techniques described herein. Since the behavior prediction can be made from a single image, the object direction component may be able to determine predicted behaviors more quickly and/or for more objects in the environment than would be possible if more images, and/or other sensor data, was required. Additionally, supplementing top-down predictions with image features allows the machine-learned model to decipher interactions between objects from a single image, which would require multiple frames and/or images captured over time to determine using conventional techniques. In some cases, the described techniques are more accurate than other behavior prediction mechanisms, thus improving safety of the autonomous vehicle and surrounding persons and/or vehicles. Conventional techniques that generated predictions based on top-down representations using sensor data such as lidar and radar may have required top-down features to be enumerated prior to making a prediction about object behavior. However, the described techniques have access to an image used to generate a top-down image feature representation, and can learn features that indicate different object behaviors, thus conserving resources by focusing processing on important features and omitting processing for those that do not tend to indicate a behavior. Accordingly, controlling the vehicle based in part on predicted behaviors of objects determined from image features can reduce processing resources, with as few as a single image being evaluated by the processing resources at one time during the behavior prediction. By controlling the vehicle based in part on predicted behaviors of objects determined using image features, the safety of the vehicle can be improved by predicting object behaviors faster and earlier, thus allowing the vehicle to make its own trajectory decisions earlier. Further, techniques for controlling the vehicle based in part on predicted behaviors of objects determined from image features can increase a confidence that the vehicle can avoid collisions with oncoming traffic and/or pedestrians by determining the behaviors earlier and with greater accuracy, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entity that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 is a pictorial flow diagram 100 of generating a top-down representation and an image feature representation based on sensor data of an environment, combining the top-down representation with the image feature representation, and controlling a vehicle based at least in part on the combined representations, in accordance with examples of the disclosure.

An operation 102 includes capturing sensor data of an environment. In some examples, the sensor data can be captured by one or more sensors on an autonomous vehicle. For example, the sensor data can include data captured by one or more of a lidar sensor, a radar sensor, an image sensor, a time of flight sensor, a sonar sensor, and the like. In at least some examples, additional environmental data may be received (e.g., map data of the environment encoding portions such as lanes, reference lines, crosswalks, traffic devices and/or signs, and the like).

An example 104 illustrates an environment in which an autonomous vehicle 106 is traversing the environment. In some examples, the autonomous vehicle 106 can perform the operations of the pictorial flow diagram 100, which can include capturing the sensor data of the environment. For the purpose of discussion, a vehicle capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle are described throughout this disclosure.

In some examples, the sensor data captured by the autonomous vehicle in the operation 102 may include image data, such as an image depicting the environment 104. The image data of the environment 104 may include pedestrians 108, vehicles 110(A), 110(B), 110(C), 110(D), . . . 110(N) (collectively, vehicles 110), and other environmental features such as bicycles, animals, buildings, vegetation, and the like. In some examples, the operation 102 can include localizing the autonomous vehicle 106 in the environment and accessing map data associated with the environment. For example, map data can comprise map elements such lane marking, lane boundaries, one or more lane references (e.g., illustrating a centerline associated with a lane and/or a route between available (e.g., legal) lanes). Additional examples of map elements can include, but are not limited to, one or more of a lane element, a bike lane element, a crosswalk element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like.

In some instances, the sensor data captured in the operation 102 can be used to determine information about the pedestrians 108 and/or the vehicles 110, including but not limited to, a type of the object (e.g., semantic information indicating a classification of the object, such as a vehicle, pedestrian, bicycle, animal, and the like). In some instances, the operation 102 can include semantically segmenting the image, determining the type of the objects included in the environment 104, a bounding box associated with the objects included in the environment 104, and/or movement information associated with the objects included in the environment, as discussed herein.

An operation 112 includes generating a top-down representation based at least in part on the sensor data. In some examples, top-down representation of the environment may comprise an image from a top-down perspective generated based at least in part on the sensor data captured in the operation 102. In some examples, the top-down representation may include semantic information of the environment and/or the autonomous vehicle 106. With respect to the autonomous vehicle 106, such semantic information may comprise a bounding box having extents (e.g., identifying the bounding box as being associated with the autonomous vehicle 106), movement information associated with the bounding box (e.g., velocity, acceleration, etc.), classification information (whether the box represents a vehicle, pedestrian, bicyclist, motorcyclist, etc.). With respect to the environment, the top-down representation may comprise semantic information indicative of speed limits, lane widths, lane ends, stop lines, traffic lights, traffic light states, and the like. Additional information regarding generating a top-down representation may be found in U.S. patent application Ser. No. 16/151,607, which is incorporated by reference herein in its entirety.

In some examples, a top-down representation component may use sensor data (e.g., lidar data, radar data, and the like) of the environment captured by sensors of the autonomous vehicle 106 to generate a top-down representation of the environment. The top-down representation component may accumulate features of objects (e.g., the pedestrians 108 and/or the vehicles 110) over a projected voxel area. The top-down representation component may combine the accumulated features into voxel features, which represent the features in the three-dimensional space of the projected voxel area.

In some examples, the top-down representation component may collapse the voxel features along the height dimension (y) to generate orthographic features. The orthographic features, therefore, represent dimensions and/or characteristics of an object in a two-dimensional plane from the three-dimensional voxel features. The top-down representation component may output the orthographic features of the object as part of a top-down representation of the environment. In examples, the top-down representation may be a multi-channel image with object information embedded in the top-down representation as described above and below. Of course, any other data which may be described in the form of a top-down image with one or more channels is contemplated (maps, radar data, etc.), including, but not limited to lidar/radar data input into other components (such as additional machine learned models) to generate corresponding top-down representations.

In some examples, the autonomous vehicle 106 may have captured data associated with the environment for the purposes of the predictions, as discussed herein. Though examples described below are referred to as having a specific color, it is understood that any such color is contemplated and, in at least some cases, is merely illustrative of a different channel of a multi-channel image whereby each channel encodes a different piece of information about the scene. Additionally, or alternatively, any object information (classification, speed, acceleration, etc.) may be encoded by a representative channel.

For instance, the environment 104 is illustrated as a top-down representation 114 generated from a perspective of the autonomous vehicle 106 at a location of the autonomous vehicle 106 in a top-down scene of the environment 104. The top-down representation 114 includes an indication 116 (e.g., indicated by an un-shaded bounding box) of the pedestrians 108, which may include information related to the type of object (e.g., pedestrians, or more specifically, adults, children, delivery people, construction workers, etc.), and/or movement information associated with the pedestrian(s) 108 embedded in the top-down representation 114 at the location of the indication 116. In some examples, pedestrians can be represented in the top-down representation 114 with a unique color, such as magenta.

Further, the top-down representation 114 includes indications 118(A), 118(B), 118(C), 118(D), . . . 118(N) (collectively, indications 118, indicated by hatched bounding boxes), of the vehicles 110. The indications 118 may include information related to the respective vehicles 110 such as the type of object (e.g., vehicles, or more specifically, cars, trucks, vans, delivery vehicles, construction equipment, parked vehicles, moving vehicles, and the like), and/or movement information associated with the respective vehicles 110 embedded in the top-down representation 114 at the locations of the indications 118. In some examples, the vehicles 110 can be represented in the top-down representation 114 with a unique color, such as blue. In some examples, although not explicitly pictured, a motion vector can be associated with the indications 118. The motion vector can represent a speed, velocity, and/or acceleration of the vehicles 110, and can be scaled proportional to other velocities of objects. In some examples, motion vectors can be represented in the top-down representation 114 with a unique color, such as orange.

Additionally, the top-down representation 114 may include information regarding speed limits, lane widths, lane ends, stop lines, traffic lights, traffic light states, and the like embedded in the top-down representation 114 as well. For instance, the described techniques may be implemented at least in part on road network data. Such road network data can include lane and junction extent and connectivity, as well as other relevant features for driving, such as crosswalks, light-lane permissibility, stop and yield lines, and the like. In some instances, road network data can be mapped to geometric primitives and can be rendered as a top-down grid/scene representation as a multichannel image (such as an RGB image) with fixed colors for each element type, as discussed herein. In some examples, information associated with the road network can be represented as a tensor. In some examples, a tensor can comprise a mathematical object analogous to but more general than a vector, wherein data is represented as an array of components that can be functions of the coordinates of a space.

In some examples, a rendered tensor of static road information is denoted as R of size W×H×3 (e.g., in those examples in which a single RGB (3-channel) image is used to encode the environmental information). In some examples, traffic light can be added to a tensor of perception information per road junction/lane masking, as discussed herein.

For each timestep t, measured quantities for each tracked entity i include 2D position $x_i^t$, velocity $v_i^t$, and acceleration $a_i^t$. The top-down representation component can determine state information uncertainty in the form of covariance matrices, which can be included in the processing via covariance norms $$\left\| \sum_{i[x,v,a]}^{t} \right\|_F.$$

In some instances, feature dimensions can be scaled by an estimate of a $99^{th}$ percentile magnitude estimation such that features are associated with comparable dynamic ranges near [−1, 1].

In some instances, a tensor for a target entity i (e.g., the pedestrians 108 and/or the vehicles 110) at any timestep t can be denoted $E_i^t$, which may include a channel for each state dimension above, and may encode the scalar at the center of the entity position, which is in spatial correspondence with road graph tensor R. To model entity interactions, operations include aggregating some or all entities (e.g., the pedestrians 108 and/or the vehicles 110) in a tensor encoded in a same or similar way:

$$E_{-i}^t = \sum_{j \neq i} E_j^t$$

(which is to say a tensor including all information except for information relating to entity, i). In some examples, such tensors can be represented as a size W×H×7, though any number is contemplated.

In some examples, additional scene context can be encoded as an RGB image $D^t$ of size W×H×3. In some examples, such additional scene context can include oriented bounding boxes of some or all entities in a scene. In some examples, bounding boxes can be colored by class type (e.g., one of cyclist, vehicle, pedestrian, etc.). In some examples, the scene context can include a rendering of traffic light permissibility in junctions, such that traffic light context can be rendered by masking road connections that exhibit each permissibility. In some examples, junction permissibility can include, but is not limited to permitted (e.g., green light), yield (e.g., unprotected), or prohibited (e.g., red light).

A state of the target object (e.g., the autonomous vehicle 106) can be represented as:

$$E_i^t = \left[ v_i^t, a_i^t, \left\| \sum_{i[x,v,a]}^{t} \right\|_F \right],$$ (1)

such that the entity state comprises a current velocity and acceleration, as well as a covariance norm of position, velocity, and acceleration.

States of other entities in the environment (e.g., the pedestrians 108 and/or the vehicles 110) can be represented as:

$$E_{-i}^t = \sum_{j \neq i} E_j^t.$$ (2)

The top-down representation 114 illustrates a dynamic context $D^t$, which, though illustrated as a single image may have multiple channels represented by different colors. In this case, different colors are represented by different hatchings, where the indication 116 (e.g., the pedestrians) are represented as a bounding box with no shading or hatching, and the indications 118 (e.g., the vehicles) are represented by hatched bounding boxes.

In some examples, some or all inputs at timestep t and target entity i (e.g., the autonomous vehicle 106) can be concatenated (e.g., in a third channel dimension) into a tensor represented as:

$$C_i^t = [E_i^t, E_{-i}^t, D^t, R]$$ (3)

which can correspond to a size W×H×20, where R corresponds to a road network. Here, C may comprise a concatenation of the entity state, all other entity states, the dynamic context, and the road network. In some instances, operations can include concatenating some or all $C_i^t$ over past history along a temporal dimension. A coordinate system can be fixed or otherwise determined for a static R for some or all timestamps by centering a reference frame at a position associated with the autonomous vehicle 106 at a time of prediction (e.g., t=0).

In some cases, the top-down representation 114 can represent a variety of information. For example, the top-down representation 114 can represent vehicle brake lights, headlights, and/or turn signals, person pose and/or gestures, audio cues, road surface features (e.g., frictional coefficients), and the like. Such additional information can be represented as any number of additional state channel dimensions.

An operation 120 includes generating an image feature representation based at least in part on the sensor data, where the image feature representation is from a top-down perspective. In examples, the image feature representation may be based on the image data of the environment 104 captured by sensors of the autonomous vehicle 106. For instance, the environment 104 is illustrated as an image feature representation 122 from a top-down perspective generated from an image capture device of the autonomous vehicle 106. The image feature representation 122 includes an indication 124 (e.g., indicated by a group of circles, at a similar location to the indication 116 in the top-down representation 114) of the pedestrians 108, which may also include information related to the type of object, and/or movement information associated with the pedestrian(s) 108 embedded in the image feature representation 122 at the location of the indication 124. Further, the image feature representation 122 includes indications 126(A), 126(B), . . . 126(N) (collectively, indications 126, indicated by groups of triangles at a similar location to the indications 118 in the top-down representation 114), of the vehicles 110. The indications 126 may include information related to the respective vehicles 110 such as the type of object, and/or movement information associated with the respective vehicles 110 embedded in the image feature representation 122 at the locations of the indications 126. Similar to the discussion above, although not explicitly pictured, the image feature representation 122 may include information regarding speed limits, lane widths, lane ends, stop lines, traffic lights, traffic light states, and the like embedded in the image feature representation 122 as well. Additional details regarding generation of an image feature representation can be found in the discussion of FIG. 2.

Although the top-down representation 114 and the image feature representation 122 are capable of including information of similar types and values, in some cases, the information embedded in the two different representations will be different. As discussed above and below, conventional top-down image generation techniques may rely upon previously enumerated feature types, which may result in the top-down image ignoring features that may indicate a behavior that would affect how the autonomous vehicle 106 is controlled, while devoting processing resources to features that may have little effect on object behavior that is relevant to the autonomous vehicle 106. By providing access to the image feature representation 122, new features that are relevant to object behavior may be determined, and relevance of features that affect object behavior may be weighted more accurately to control driving outcomes of the autonomous vehicle 106.

As such, an operation 128 includes combining the top-down representation with the image feature representation. For example, a concatenation component of the autonomous vehicle 106 may combine the top-down representation 114 with the image feature representation 122 by concatenating the top-down features with the image features. Thus, the concatenation component may create a "concatenated representation" that includes information from both the top-down representation 114 and the image feature representation 122 regarding object type, bounding boxes, movement information, and the like. In some examples, as discussed in more detail below with regards to FIG. 3, a machine-learned model may be trained to make improved predictions from the concatenated features about object behaviors in the environment surrounding the autonomous vehicle 106.

Accordingly, an operation 130 includes controlling a vehicle based at least in part on the combined representations. For example, the pictorial flow diagram 100 can include determining an amount of overlap of a bounding box representing the autonomous vehicle 106 and prediction probabilities associated with the various objects in the environment 104, including (but not limited to) the pedestrians 108 and/or the vehicles 110. In some examples, the process can include evaluating a candidate trajectory of the autonomous vehicle 106 to determine an overlap between predicted future motion and the prediction probabilities, among other possibilities.

Figure 2:
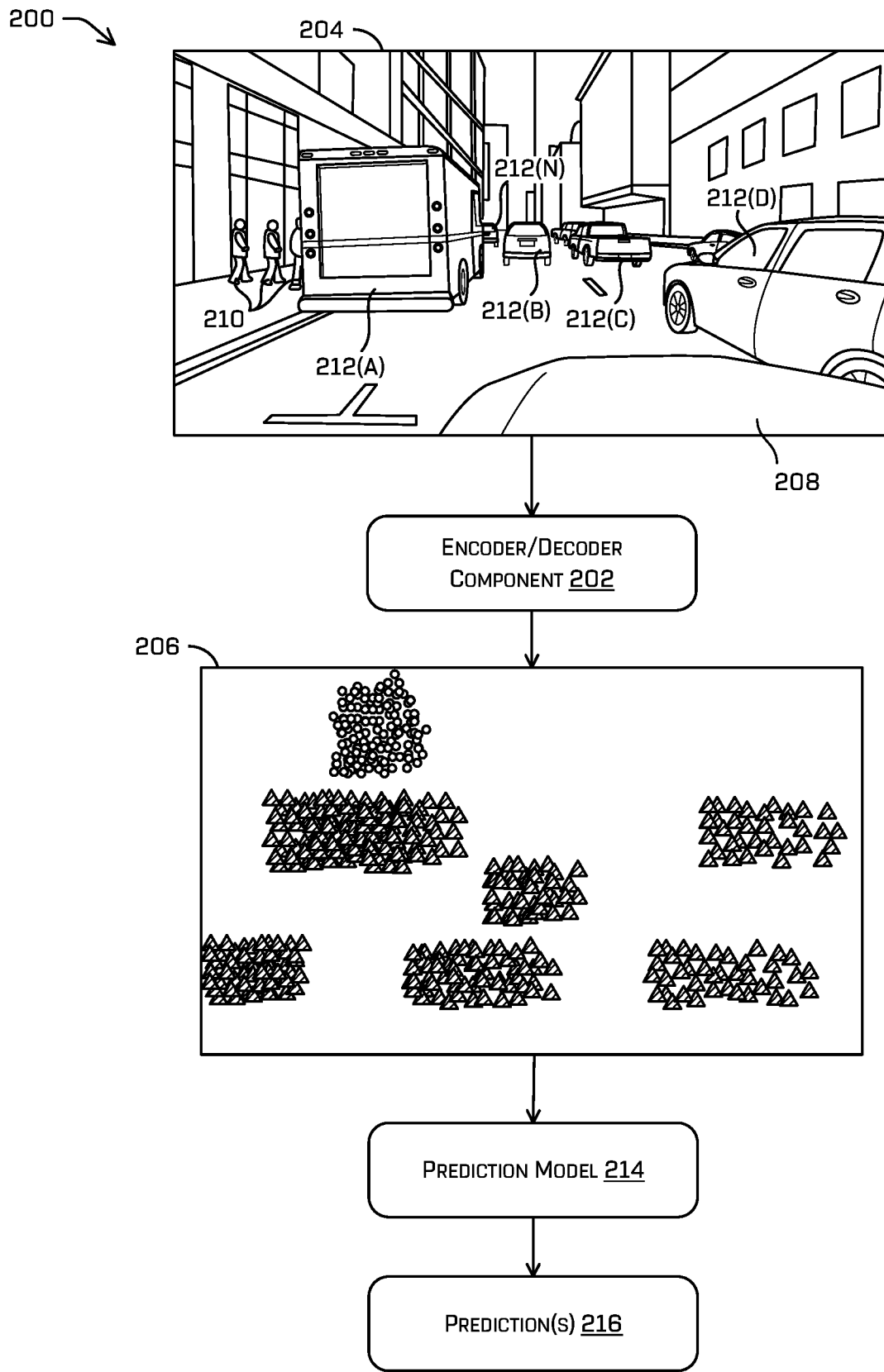
FIG. 2 is an illustration of generating an image feature representation which may be used to make predictions for objects in an environment, in accordance with examples of the disclosure.

FIG. 2 is an illustration 200 of generating an image feature representation which may be used to make predictions for objects in an environment, in accordance with examples of the disclosure.

In examples, an encoder/decoder component 202 may receive image data that includes an image 204 captured by a sensor of an autonomous vehicle. In some examples, the encoder/decoder component 202 may include a neural network encoder (e.g., a fully connected, convolutional, recurrent, etc.) that receives the image 204 and outputs an image feature representation 206. The image feature representation 206 may include tensors associated with image features of the image 204. As discussed above, a tensor can comprise a mathematical object analogous to but more general than a vector, wherein data is represented as an array of components that can be functions of the coordinates of a space. In some examples, additional information about the camera associated with the image data may additionally or alternatively be input into the encoder/decoder component 202. As a non-limiting example, one or more of sensor intrinsics (internal calibration parameters) and/or extrinsics (external calibration parameters) may be input into the network.

Similar to the discussion above, a rendered tensor of static road information is denoted as R of size W×H×3 (e.g., in those examples in which a single RGB (3-channel) image is used to encode the environmental information). The encoder/decoder component 202 can determine state information uncertainty in the form of covariance matrices, which can be included in the processing via covariance norms $\|\Sigma_{i\{x,v,a\}}^t\|_F$. In some instances, feature dimensions can be scaled by an estimate of a $99^{th}$ percentile magnitude estimation such that features are associated with comparable dynamic ranges near $[-1, 1]$.

A tensor for a target entity i (e.g., a vehicle 208) at any timestep t can be denoted $E_i^t$, which may include a channel for each state dimension above, and may be in spatial correspondence with road graph tensor R, similar to the top-down representation 114. To model entity interactions, operations include aggregating some or all entities (e.g., other objects depicted in the image 204 as described herein) in a tensor encoded in a same or similar way:

$$E_{-i}^t = \sum_{j \neq i} E_j^t$$

a tensor including all information except for information relating to entity, i). In some examples, such tensors can be represented as a size W×H×7, though any number is contemplated.

The encoder/decoder component 202 may also include a neural network decoder (e.g., a same type of network as the encoder, in an opposite orientation) that receives the tensor output from the encoder and outputs the image feature representation 206 in the form of a multi-channel image that incorporates various tensors for different image features with channels of the multi-channel image. As discussed in relation to FIG. 1, the image 204 may depict an object 210 (e.g., pedestrians) and one or more objects 212(A), 212(B), 212(C), 212(D), . . . 212(N) (collectively objects 212, representing vehicles). The image feature representation 206 may illustrate a dynamic context $D^t$, which, though illustrated as a single image may have multiple channels represented by different colors. In this case, different colors are represented by different shapes/hatchings, where the object 210 (e.g., the pedestrians) are represented by empty circles, the objects 212 (e.g., the vehicles) are represented by hatched triangles.

In some examples, some or all inputs at timestep t and target entity i (e.g., the vehicle 208, or any other object 212) can be concatenated (e.g., in a third channel dimension) into a tensor represented as:

$$C_i^t = [E_i^t, E_{-i}^t, D^t, R] \qquad (4)$$

which can correspond to a size W×H×20, where R corresponds to a road network. Here, C may comprise a concatenation of the entity state, all other entity states, the dynamic context, and the road network. In some instances, operations can include concatenating some or all $C_i^t$ over past history along a temporal dimension. A coordinate system can be fixed or otherwise determined for a static R for some or all timestamps by centering a reference frame at a position associated with the vehicle 208 at a time that the encoder/decoder component 202 generates the image feature representation 206 (e.g., t=0).

In some cases, the image feature representation 206 can represent a variety of information. For example, the image feature representation 206 can represent vehicle brake lights, headlights, and/or turn signals, person pose and/or gestures, audio cues, road surface features (e.g., frictional coefficients), and the like. The image feature representation 206 may represent the same and/or different features than those represented in the top-down representation 114 described in relation to FIG. 1. Such additional information can be represented as any number of additional state channel dimensions.

The encoder/decoder component 202 may be trained to recognize image features that accurately predict object behaviors, such as a blinker or swerve indicating an intended lane change, a pose of a pedestrian indicating intent to enter a drivable region, and the like. In examples, the encoder/decoder component 202 has access to the entirety of the image 204 to utilize in generating the image feature representation, which in turn may be used to predict object behaviors. Therefore, the encoder/decoder component 202 may "learn" different image features (e.g., based on data included in tensors), or relationships between image features, that more accurately predict behaviors than relying on preset top-down features alone. In some examples, the encoder/decoder component 202 may include one or more machine-learning models trained based on log data and/or tracking information of objects in an environment, such as by comparing features objects as captured in an image to actions taken by the objects following the time the image was captured.

For example, the image feature representation 206 may be input into a prediction model 214. The prediction model 214 may be a machine-learned model comprising a convolutional neural network, configured to output a probability of object behaviors for one or more objects in the environment. For instance, the prediction model may represent future states of an entity, such as: 1) a probability distribution over the entity state space at each timestep; 2) multimodal (e.g., representing a plurality of possible trajectories) to cover a diversity of possible implicit actions an entity might take (e.g., which way an entity is likely to travel through a junction with a plurality of possibilities); and 3) one-shot, meaning the ability to predict full trajectories (and/or time sequences of state distributions) without iteratively applying a recurrence step. The prediction model 214 may output one or more prediction(s) 216 associated with object behaviors for the objects 210 and 212. For example, in the case of the object 210 (e.g., a pedestrian) the predictions 216 may include probabilities associated with the pedestrian entering a drivable region, the pedestrian leaving a drivable region, the pedestrian not moving, and so forth. In the case of the objects 212 (e.g., one or more of the vehicles), the predictions 216 may include probabilities associated with a vehicle staying in a particular lane, the vehicle turning, the vehicle changing lanes, the vehicle parking, the vehicle reversing, and so on.

Figure 3:
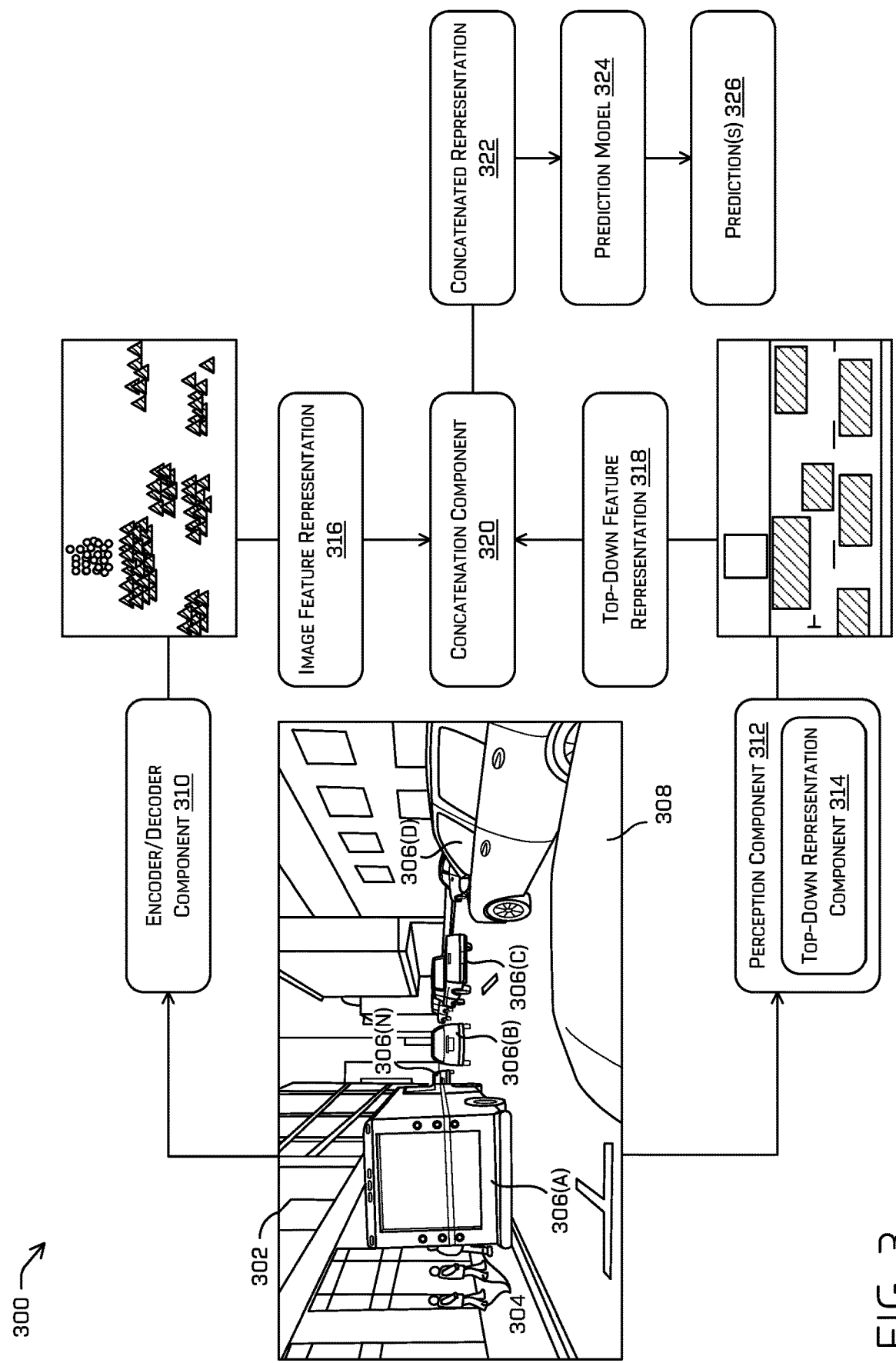
FIG. 3 depicts an example system which may be used to generate predictions by supplementing a top-down representation with an image feature representation, in accordance with examples of the disclosure.

FIG. 3 depicts an example system 300 which may be used to generate predictions by supplementing a top-down representation with an image feature representation, in accordance with examples of the disclosure.

An image 302 depicts an object 304 (e.g., pedestrians), one or more objects 306(A), 306(B), 306(C), 306(D), . . . 306(N) (collectively objects 306, representing vehicles), and a vehicle 308, similar to the discussion above. The image 302 may be generated from a sensor of a sensor system of the vehicle 308, where the sensor system may also generate sensor data such as lidar data, radar data, time-of-flight data, and so forth. Image data that includes the image 302 may also include a pose of an image sensor used to capture the image 302, where the pose of the image sensor is relative to the vehicle 308. Further, the image data may include information related to intrinsics of the image sensor used to capture the image 302 (e.g., focal length, image sensor format, and the like). The image 302 (and/or any accompanying image data, such as sensor calibration data, which may include a relative position and orientation of the sensor) may be input to an encoder/decoder component 310, similar to the encoder/decoder component 202 of FIG. 2. Additionally, in some examples, the image 302 (and/or other sensor data from the sensor system) may be output to a perception component 312, which may include a top-down representation component 314. The perception component 312 can include functionality to perform object detection, segmentation, and/or classification, as discussed in more detail below with reference to the perception component 422 of FIG. 4.

In some examples, the encoder/decoder component 310 may output an image feature representation 316 of the image 302, where the image feature representation 316 comprises a multi-channel image that incorporates various tensors for different image features with channels of the multi-channel image. Likewise, the perception component 312 may output a top-down feature representation 318 generated by the top-down representation component 314 that may be a multi-channel image with object information embedded in the top-down representation, for instance, where tensors include information regarding top-down features of the objects in the environment. In some examples, the image feature representation 316 and the top-down feature representation 318 may be generated substantially simultaneously following capture of the image 302. Additionally, in examples, the scene depicted in the image feature representation 316 may correspond to the scene depicted in the top-down feature representation 318, such that features of the object(s) depicted in the image feature representation 316 are at a same or similar location to corresponding features of the object(s) depicted in the top-down feature representation 318.

A concatenation component 320 may receive the image feature representation 316 and the top-down feature representation 318, and may generate a concatenated representation 322 that includes the features included in the respective representations. For example, features that are at similar locations between the image feature representation 316 and the top-down feature representation 318 may be concatenated by appending one feature to another, such as a wheel direction feature identified in the image feature representation 316 and a velocity feature identified in the top-down feature representation 318. In some cases, features may be identified in the image feature representation 316 that are not identified in the top-down feature representation 318 (and vice versa), in which case the concatenation component 320 may include the feature identified in one of the representations when generating the concatenated representation. The features included in the image feature representation 316 and included in the top-down feature representation 318 may be concatenated along a layer channel dimension of the concatenated representation 322, where a position of the feature from the image feature representation 316 is aligned with a position of the feature from the top-down feature representation 318 when the concatenation component 320 generates the concatenated representation 322.

The concatenation component 320 may output the concatenated representation 322 to a prediction model 324. The prediction model 324 may comprise one or more machine-learned models trained to predict object behavior based on the concatenated representation 322. The prediction model 324 may output one or more prediction(s) 326 of object behaviors associated with one or more of the objects 304 and/or 306 depicted in the image 302. For instance, for the objects 306 that include vehicles, the predicted behavior included in the predictions 326 may include a stay-in-lane action, a turn action, or a lane change action. For the objects 304 that include pedestrians, the predicted behavior included in the predictions 326 may include an entering-a-drivable-region action, a leaving-the-drivable-region action, or a non-moving action. Other predicted behaviors that may be included in the predictions 326 are also contemplated.

In some examples, the concatenation component 320 may generate the concatenated representation 322 based on multiple image feature representations and/or multiple top-down feature representations. For instance, the concatenation component 320 may use sensor data and/or image data captured at a time before and/or after the image 302 is captured to generate additional concatenated representations, which in turn may be input into the prediction model 324 to generate the predictions 326. In other words, the prediction model 324 may generate the predictions 326 using data of the environment captured over a span of time.

Alternatively or additionally, the encoder/decoder component 310 may rely upon the image sensor (or camera) intrinsics when generating the image feature representation 316. In some cases, the vehicle 308 may have multiple cameras spaced at different locations about the body of the vehicle 308, where each camera may have a respective encoder/decoder component 310 trained based on the intrinsics of the different cameras. When multiple cameras are used to capture multiple images of the environment (e.g., substantially simultaneously, with additional sensor data supplied to the perception component 312) and generate multiple image feature representations, the concatenation component 320 may concatenate the multiple image feature representations when generating the concatenated representation 322. Therefore, the prediction model 324 may be provided with additional information in the concatenated representation 322 that includes tensors supplied from multiple images captured by different cameras, which may improve the predictions 326.

Figure 4:
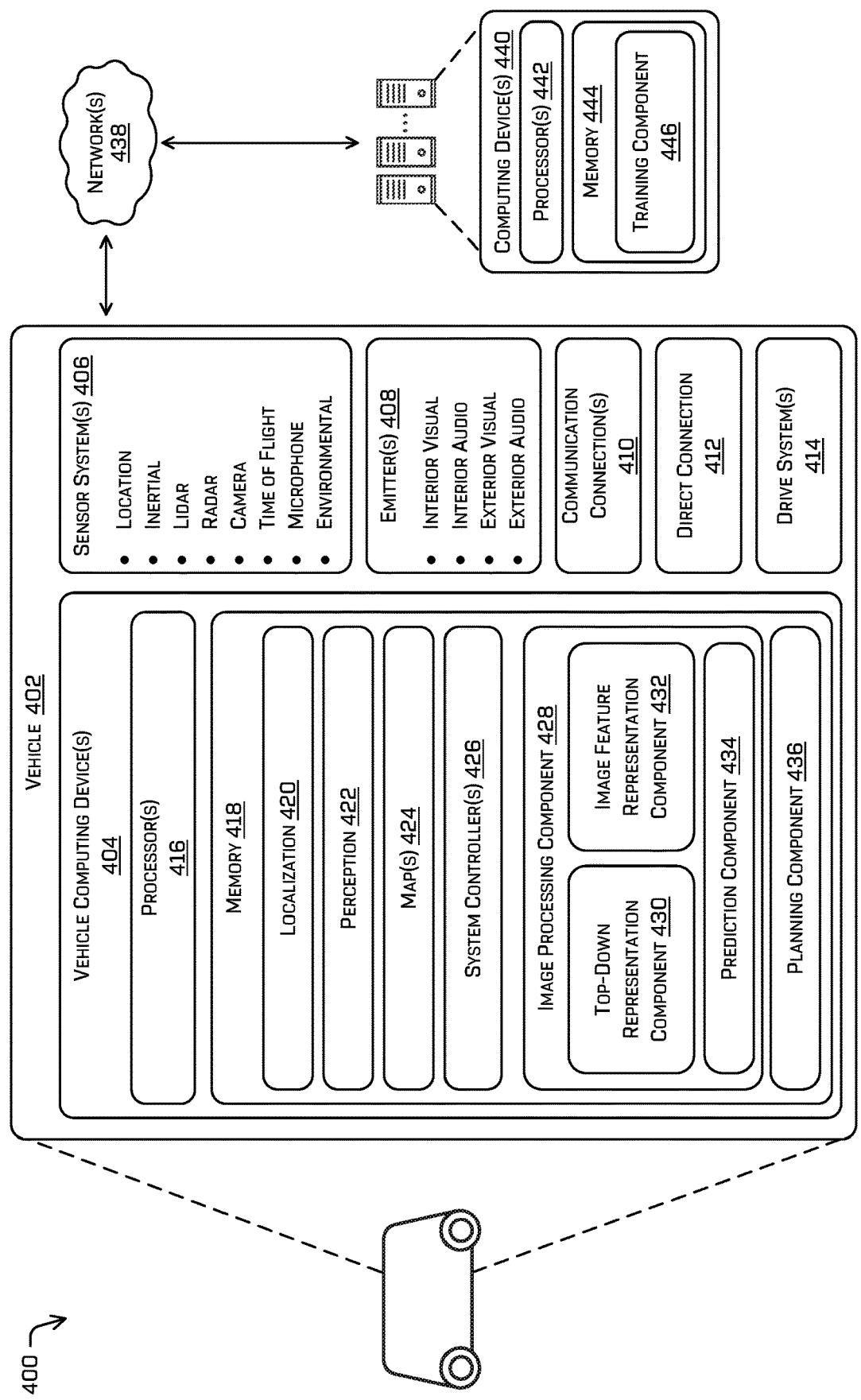
FIG. 4 depicts a block diagram of an example system for implementing the techniques described herein.

FIG. 4 depicts a block diagram of an example system 400 for implementing the techniques described herein. In at least one example, the system 400 can include a vehicle 402, such as an autonomous, semi-autonomous, or manually controlled vehicle.

The vehicle 402 can include vehicle computing device(s) 404, one or more sensor systems 406, one or more emitters 408, one or more communication connections 410, at least one direct connection 412, and one or more drive systems 414.

The vehicle computing device(s) 404 can include one or more processors 416 and memory 418 communicatively coupled with the one or more processors 416. In the illustrated example, the vehicle 402 is an autonomous vehicle; however, the vehicle 402 could be any other type of vehicle or robotic platform. In the illustrated example, the memory 418 of the vehicle computing device(s) 404 stores a localization component 420, a perception component 422, one or more maps 424, one or more system controllers 426, an image processing component 428, a top-down representation component 430, an image feature representation component 432, a prediction component 434, and a planning component 436. Though depicted in FIG. 4 as residing in the memory 418 for illustrative purposes, it is contemplated that the localization component 420, the perception component 422, the one or more maps 424, the one or more system controllers 426, the image processing component 428, the top-down representation component 430, the image feature representation component 432, the prediction component 434, and the planning component 436 can additionally, or alternatively, be accessible to the vehicle 402 (e.g., stored on, or otherwise accessible by, memory remote from the vehicle 402).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory, for determining to retrieve map data, and so forth, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, wheel, pedestrian, cyclist, animal, building, tree, road surface, curb, sidewalk, stoplight, stop sign, lane marker, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 422 performs detection, the perception component 422 may output detections of objects detected in an image. Such detections may comprise two-dimensional bounding boxes and/or masks of detected objects. In some examples, such detection may utilize a machine learning approach (e.g., scale-invariant feature transform (SIFT), histogram of oriented gradients (HOG), etc.) followed by a support vector machine (SVM) to classify objects depicted in images received from a camera of the sensor system 406. Alternatively or additionally, detection may utilize a deep learning approach based on a convolutional neural network (CNN) to classify objects depicted in images received from a camera of the sensor system 406. In examples, the detection may utilize one or more of the object detection techniques (or others) to detect an object depicted in an image according to the described techniques. The memory 418 can further include one or more maps 424 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 424 can include at least one map (e.g., images and/or a mesh). In some examples, the vehicle 402 can be controlled based at least in part on the maps 424. That is, the maps 424 can be used in connection with the localization component 420, the perception component 422, the image processing component 428, the prediction component 434, or the planning component 436 to determine a location of the vehicle 402, identify objects in an environment, and/or generate routes and/or trajectories to navigate within an environment.

In some examples, the one or more maps 424 can be stored on a remote computing device(s) (such as the computing device(s) 440) accessible via network(s) 438. In some examples, multiple maps 424 can be stored based on, for example, a characteristic (e.g., type of entity, time of day, day of week, season of the year, etc.). Storing multiple maps 424 can have similar memory requirements, but increase the speed at which data in a map can be accessed. In some examples, the one or more maps 424 can store sizes or dimensions of objects associated with individual locations in an environment. For example, as the vehicle 402 traverses the environment and as maps representing an area proximate to the vehicle 402 are loaded into memory, one or more sizes or dimensions of objects associated with a location can be loaded into memory as well.

In general, the image processing component 428 can predict object behavior based on data (e.g., image data or other sensor data) provided by the sensor system(s) 406. In some instances, the image processing component 428 can provide information generated by the top-down representation component 430, the image feature representation component 432, and/or the prediction component 434 to the planning component 436 to determine when and/or how to control the vehicle 402 to traverse an environment. As discussed herein, the image processing component 428 can receive image data, map data, lidar data, and the like to determine information about objects in an environment.

The top-down representation component 430 may generate top-down representations from image data and/or other sensor data (e.g., map data, lidar data, radar data, time-of-flight data, etc.). In some examples, the top-down representation component 430 may be configured to execute functionality similar to the top-down representation component 314 of FIG. 3. For instance, the top-down representation component 430 may generate a top-down representation comprising a multi-channel image that includes semantic map information along with tensor information for a target object and/or other objects in an environment. Channels of the multi-channel image may represent features such as vehicle brake lights, headlights, and/or turn signals, person pose and/or gestures, audio cues, road surface features (e.g., frictional coefficients), and the like.

The image feature representation component 432 may comprise an encoder and decoder to generate a multi-channel representation from image data received from the sensor system(s) 406. In examples, the image feature representation component 432 may include a neural network encoder (e.g., a fully connected, convolutional, recurrent, etc.) that receives an image and outputs a tensor associated with an image feature of the image. The image feature representation component 432 may also include a neural network decoder (e.g., a same type of network as the encoder, in an opposite orientation) that receives the tensor output from the encoder and outputs an image feature representation in the form of a multi-channel image in a top-down perspective that incorporates various tensors for different image features with channels of the multi-channel image.

The prediction component 434 can generate predictions of object behavior based at least in part on an image feature representation received from the image feature representation component 432, and in some cases, together with a top-down representation received from the top-down representation component 430. For instance, the prediction component 434 may employ a machine-learned model similar to that of the prediction model 324 of FIG. 3, comprising a convolutional neural network, configured to output a probability of object behaviors for one or more objects in the environment based on an image feature representation received from the image feature representation component 432. Alternatively of additionally, the prediction component 434 may combine an image feature representation received from the image feature representation component 432 with a top-down representation received from the top-down representation component 430, such as by concatenating an image feature representation with a top-down representation to form a concatenated representation. The prediction component 434 may input the concatenated representation into a machine-learned model trained to predict object behaviors such as lane change predictions, turning predictions, entering/exiting drivable region predictions, and the like.

In general, the planning component 436 can determine a path for the vehicle 402 to follow to traverse the environment. For example, the planning component 436 can determine various routes and trajectories and various levels of detail. For example, the planning component 436 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 436 can generate an instruction for guiding the autonomous vehicle along at least a portion of the route from the first location to the second location. In at least one example, the planning component 436 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In some instances, the planning component 436 can generate one or more trajectories for the vehicle 402 based at least in part on predicted object behaviors in the environment as determined from top-down representations and/or image feature representations, as discussed herein. In some examples, the planning component 436 can use temporal logic, such as linear temporal logic and/or signal temporal logic, to evaluate one or more trajectories of the vehicle 402.

In at least one example, the vehicle computing device(s) 404 can include one or more system controllers 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402.

As can be understood, the components discussed herein (e.g., the localization component 420, the perception component 422, the one or more maps 424, the one or more system controllers 426, the image processing component 428, the top-down representation component 430, the image feature representation component 432, the prediction component 434, and the planning component 436) are described as divided for illustrative purposes. However, the operations performed by the various components can be combined or performed in any other component. By way of example, functions described in relation to the image processing component 428, the top-down representation component 430, the image feature representation component 432, and/or the prediction component 434 may be performed by the perception component 422 to reduce the amount of data transferred by the system.

In at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device(s) 404. Additionally or alternatively, the sensor system(s) 406 can send sensor data, via the one or more networks 438, to the one or more computing device(s) at a particular frequency, after a lapse of a predetermined period of time, in near real-time, etc.

The vehicle 402 can also include one or more emitters 408 for emitting light and/or sound, as described above. The emitters 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communication connection(s) 410 also enable the vehicle 402 to communicate with a remote teleoperations computing device or other remote services.

The communication connection(s) 410 can include physical and/or logical interfaces for connecting the vehicle computing device(s) 404 to another computing device or a network, such as network(s) 438. For example, the communications connection(s) 410 can enable Wi-Fi-based communication such as via frequencies defined by the IEEE 802.11 standards, short range wireless frequencies such as Bluetooth®, cellular communication (e.g., 2G, 3G, 5G, 5G LTE, 5G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In at least one example, the localization component 420, the perception component 422, the one or more maps 424, the one or more system controllers 426, the image processing component 428, the top-down representation component 430, the image feature representation component 432, the prediction component 434, and the planning component 436 can process sensor data, as described above, and can send their respective outputs, over the one or more network(s) 438, to one or more computing device(s) 440. In at least one example, the localization component 420, the perception component 422, the one or more maps 424, the one or more system controllers 426, the image processing component 428, the top-down representation component 430, the image feature representation component 432, the prediction component 434 and the planning component 436 can send their respective outputs to the one or more computing device(s) 440 at a particular frequency, after a lapse of a predetermined period of time, in near real-time, etc.

In some examples, the vehicle 402 can send sensor data to one or more computing device(s) 440 via the network(s) 438. In some examples, the vehicle 402 can send raw sensor data to the computing device(s) 440. In other examples, the vehicle 402 can send processed sensor data and/or representations of sensor data to the computing device(s) 440. In some examples, the vehicle 402 can send sensor data to the computing device(s) 440 at a particular frequency, after a lapse of a predetermined period of time, in near real-time, etc. In some cases, the vehicle 402 can send sensor data (raw or processed) to the computing device(s) 440 as one or more log files.

The computing device(s) 440 can include processor(s) 442 and a memory 444 storing a training component 446.

In some instances, the training component 446 can include functionality to train one or more models to detect objects in an environment, predict object behavior based on top-down representations, predict object behavior based on image feature representations, predict object behavior based on combined top-down representations and image feature representations, and the like. In some instances, the training component 446 can also include functionality to train a machine learning model to output one or more confidence values associated with the one or more predicted behaviors, or one or more heat maps including prediction probabilities. For example, the training component 446 can receive a set of images representing a top-down view of an environment. The set of images may be received from log data in some cases, where the log data comprises recorded events of objects in an environment. In some cases, the set of images can represent an agent traversing through an environment for a period of time, such as 5 seconds, 7 seconds, 10 seconds, 20 seconds, and the like. At least a portion of the set of images can be used as an input to train the machine learning model, and at least a portion of the set of images can be used as ground truth information for training the machine learning model. As a non-limiting example, a first set (e.g., 3, 4, 5, or more) of a sequence of images may be input into the machine learned model. A second set of images (or trajectory information associated therefrom—e.g., by extracting positions and/or velocities from the images) in the sequence of images immediately preceding the first set may then be used as ground truth for training the model. Thus, by providing images of recorded trajectories where agents traverse an environment, the prediction component 434 can be trained to output predicted behaviors, confidence values associated with the predicted behaviors, or one or more heat maps including prediction probabilities, as discussed herein. In some instances, the training component 446 can communicate information generated by the one or more models to the vehicle computing device(s) 404 to revise how to control the vehicle 402 in response to different situations.

For instance, aspects of some or all of the components discussed herein can include any models, algorithms, and/or machine learning algorithms. For example, in some instances, the components in the memory 444 (and the memory 418, discussed above) can be implemented as a neural network. In some examples, the training component 446 can utilize a neural network to generate and/or execute one or more models to improve various aspects of object behavior prediction for use in trajectory planning of the vehicle 402.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 416 of the vehicle 402 and the processor(s) 442 of the computing device(s) 440 can be any suitable processor capable of executing instructions to process data and perform operations as described herein. By way of example and not limitation, the processor(s) 416 and 442 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 444 are examples of non-transitory computer-readable media. The memory 418 and 444 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 440 and/or components of the computing device(s) 440 can be associated with the vehicle 402. That is, the vehicle 402 can perform one or more of the functions associated with the computing device(s) 440, and vice versa. Further, aspects of the image processing component 428 and/or the planning component 436 can be performed on any of the devices discussed herein. For example, any or all of the functionality and components described with reference to FIGS. 1-3 can be implemented by the image processing component 428 or other components of vehicle 402.

Figure 5:
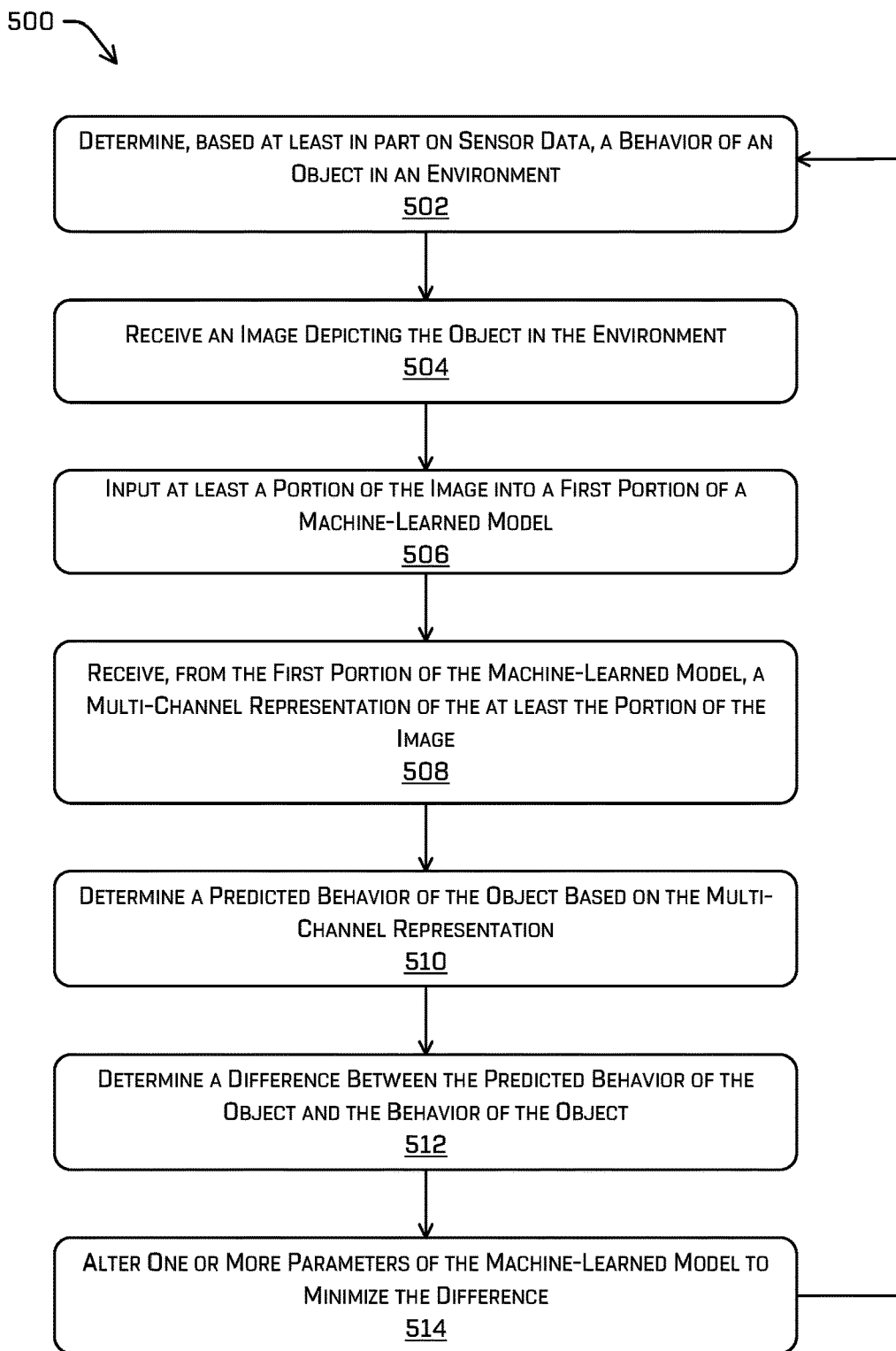
FIG. 5 depicts an example process for training a machine-learned model by determining a behavior of an object in an environment, inputting at least a portion of an image into the machine-learned model, receiving a multi-channel representation of the at least the portion of the image, using the multi-channel image to predict a behavior of the object, determining a difference between the predicted behavior and the behavior, and altering parameters of the machine-learned model to minimize the difference, in accordance with examples of the disclosure.

FIG. 5 depicts an example process 500 for training a machine-learned model by determining a behavior of an object in an environment, inputting at least a portion of an image into the machine-learned model, receiving a multi-channel representation of the at least the portion of the image, using the multi-channel image to predict a behavior of the object, determining a difference between the predicted behavior and the behavior, and altering parameters of the machine-learned model to minimize the difference, in accordance with examples of the disclosure. For example, some or all of the process 500 can be performed by one or more components in FIG. 4, as described herein. For example, some or all of the process 500 can be performed by the vehicle computing device(s) 404, the computing device(s) 440, or any other computing device or combination of computing devices. Further, any of the operations described in the example process 500 may be executed in parallel, in a different order than depicted in the process 500, omitted, combined with the process 600, combined with other processes, and the like.

At operation 502, the process can include determining, based at least in part on sensor data, a behavior of an object in an environment. In some cases, the sensor data may be received from log data comprising previously generated sensor data, and/or may be continuously generated as a vehicle proceeds through an environment. In some examples, the sensor data may include multiple images (including or in addition to the image described below in operation 504) that depict a behavior of an object over time. In such examples, a track (or path) of the detected object and/or parameters associated with the object (length, width, velocity, pose, and the like) may be used to determine the behavior. In at least some examples, multiple images depicting objects may be annotated based on multiple classifications or with designated behaviors. Alternatively or additionally, the sensor data may use data collected using other sensor modalities to determine the behavior of an object, such as lidar, radar, TOF, and the like. In some examples in which the sensor data is received from log data, determining the behavior of the object may comprise receiving a portion of the log data associated with a time the image was taken and determining the behavior from the log data. In one example, determining the of an object may include determining a first portion of log data generated after the image was captured, and determining a second portion of the log data generated substantially simultaneously with an image of the object. Then, the behavior may be determined by comparing the first portion of the log data with the second portion of the log data. For instance, the comparison may include comparing a distance between a first position in the first portion of the log data and a second position of the second portion of the log data, comparing a first trajectory of the first portion of the log data with a second trajectory of the second portion of the log data, determining a curvature between a first position in the first portion of the log data and a second position in the second portion of the log data, and comparing a first velocity in a first portion of the log data and a second velocity of a second portion of the log data, to name a few examples.

At operation 504, the process can include receiving an image depicting the object in the environment. For example, the image may have been captured by a camera included as a sensor on an autonomous vehicle as it traversed an environment, as just described. The camera may have captured images of the surrounding environment as the autonomous vehicle traversed the environment.

At operation 506, the process can include inputting at least a portion of the image into a first portion of a machine-learned model. In some examples, the machine-learned model is a supervised model, in which the model is trained using labeled training examples to generate an inferred function to map new, unlabeled examples. Alternatively or additionally, the machine-learned model trained to determine object behavior may be an unsupervised model, which may identify commonalities in an input data set and may react based on the presence or absence of such commonalities in each new piece of data. In some such examples, various clustering algorithms (such as k-means) may be used to determine clusters of behaviors. As an example, where three clusters are selected, such an unsupervised model may output clusters corresponding to a left-lane-change action, a right-lane-change action, or a maintaining lane action.

In some cases, a dense connected convolutional neural network may be used, which may simplify the connectivity pattern between layers of the architecture. The architecture may be trained as an encoder and decoder, where the encoder may include a neural network encoder (e.g., a fully connected, convolutional, recurrent, etc.) that receives the image and outputs a tensor associated with an image feature of the image. As discussed above, a tensor can comprise a mathematical object analogous to but more general than a vector, wherein data is represented as an array of components that can be functions of the coordinates of a space. The architecture may also include a neural network decoder (e.g., a same type of network as the encoder, in an opposite orientation) that receives the tensor output from the encoder and outputs an image feature representation in the form of a multi-channel image in a top-down perspective that incorporates various tensors for different image features with channels of the multi-channel image.

According to some examples, the machine-learned model may be trained using training data generated based on historical sensor data (and/or previously generated output based on such historical data) from one or more perception logs or other sources of historical sensor data. The training data may be generated by associating log data such as historical image data (e.g., based on other historical sensor data) indicating the actual measured behavior of an object depicted in the image over time. The log data may include or be based at least in part on historical sensor data such as lidar data, radar data, TOF data, or combinations of these or other sensor modalities. The log data may include track data describing the tracks of one or more objects sensed in the environment of the autonomous vehicle. In some examples, the track data may indicate a yaw, a trajectory, or the like, which may be used to determine a measured behavior of an object. For instance, an image depicting a vehicle turned to the left can be labeled with an actual measured speed, yaw, yaw rate, and/or trajectory of the vehicle at the time the image was captured (e.g., as may be provided by the tracking information, radar returns, or the like associated with the vehicle depicted in the image) and/or at a time following the time at which the image was captured. In at least some examples, tracks may comprise historical sequences of any one or more of positions, velocities, accelerations, yaw (and/or steering angle), yaw rates, and the like associated with an object. In at least some examples, multiple points of a track may be used to determine the behavior (e.g., by determining the necessary distance for a lane change action). This labeling can be performed for some or all of the images depicting objects to generate training data which can be used to train a neural network or other machine learned model, as described elsewhere herein. Based on this training data, the machine-learned model may be trained to detect and/or predict behaviors of a variety of different objects in an environment, along with predicting trajectories associated with said behaviors, based on the objects as captured in an image.

At operation 508, the process can include receiving, from the machine-learned model, a multi-channel representation of the at least the portion of the image. In some examples, the channels may represent features of the object, such as velocity, wheel direction, blinker state, and pose, to name a few examples.

At operation 510, the process can include determining a predicted behavior of the object based on the multi-channel representation. In some examples, a prediction model may determine the predicted behavior using one or more machine-learning models, such as a convolutional neural network, configured to output a probability of object behaviors for one or more objects in the environment. For instance, the prediction model may represent future states of an entity, such as: 1) a probability distribution over the entity state space at each timestep; 2) multimodal (e.g., representing a plurality of possible trajectories) to cover a diversity of possible implicit actions an entity might take (e.g., which way an entity is likely to travel through a junction with a plurality of possibilities); and 3) one-shot, meaning the ability to predict full trajectories (and/or time sequences of state distributions) without iteratively applying a recurrence step.

At operation 512, the process can include determining a difference between the predicted behavior of the object and the behavior of the object. Consider an example where the prediction model indicates an 80 percent chance (e.g., based on the multi-channel image input into the prediction model) that a vehicle in the environment will change lanes to the left within three seconds of the image being captured. If the measured trajectory of the vehicle is the same as the output of the machine-learned model, e.g., the vehicle made a left lane change within three seconds of the image being captured, then the difference may be zero. However, if the measured trajectory is different from the output of the machine-learned model, e.g., the vehicle continued on a straight path, then the difference may be represented by the difference between the machine-learned model output (80 percent likelihood) and the ground truth (0), e.g., a difference of 0.8. Of course, any number of representations of behaviors may be used as described elsewhere herein, and any suitable technique for representing a difference between the output of the machine-learned model and the true, measured behavior may also be used without departing from the scope of the disclosure. Determining such a difference may comprise determining a cross-entropy loss, a heteroscedastic loss, or the like.

At operation 514, the process can include altering one or more parameters of the machine-learned model to minimize (or optimize) the difference (for example, by back-propagating the loss). By altering the parameters of the machine-learned model to minimize the difference, the machine-learned model "learns" over time to accurately predict the behaviors of objects based on image features, along with refining top-down predictions based on the image features.

In some examples, the process may return to operation 502, to continue determining object behavior of objects in an environment, thus continuing to refine the machine-learned model to more accurately predict behaviors of objects depicted in images. Alternatively or additionally, the machine-learned model may be transmitted to an autonomous vehicle for use in controlling the autonomous vehicle based on predicted behaviors of objects based on image features.

Figure 6:
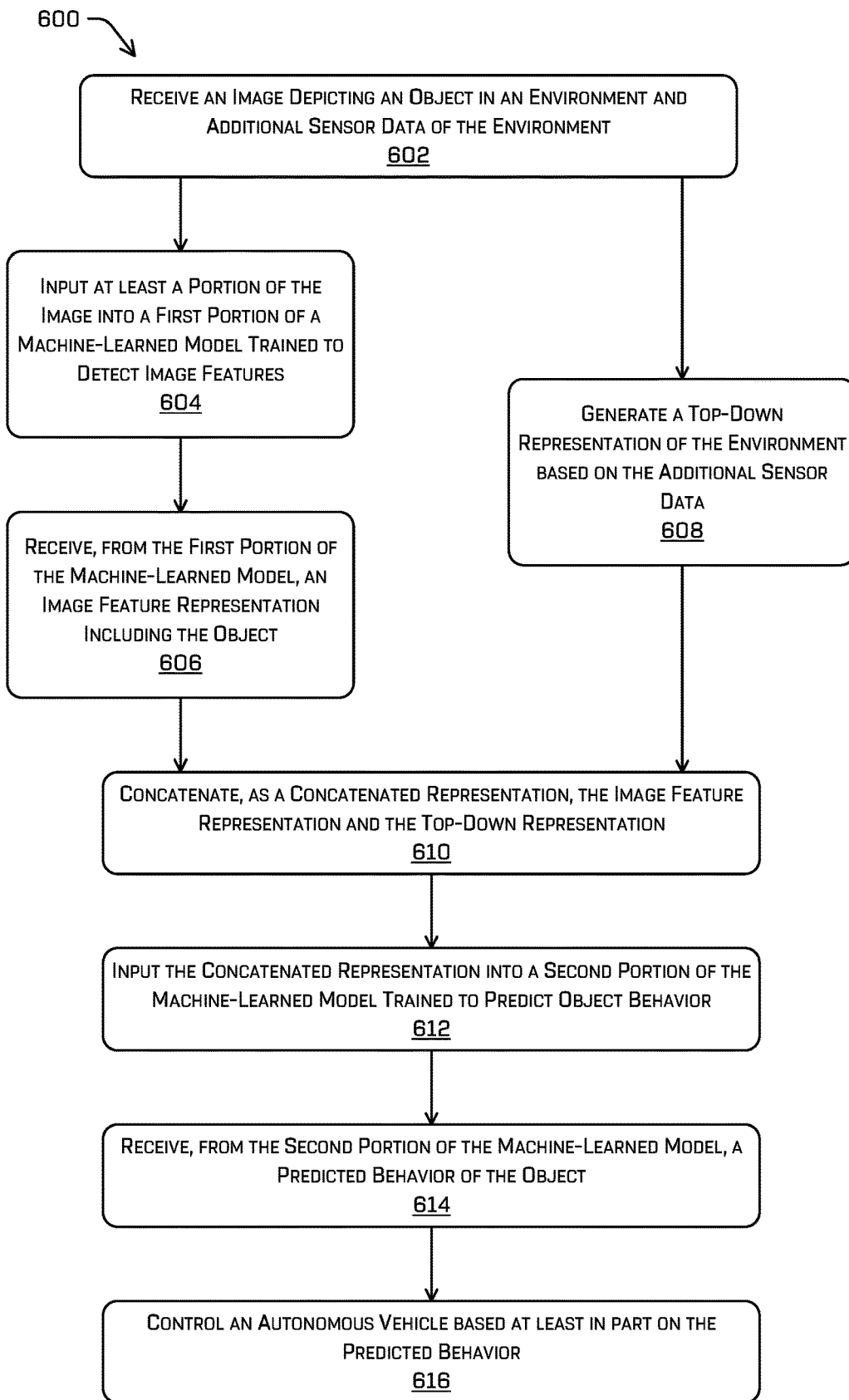
FIG. 6 depicts an example process for concatenating, as a concatenated representation, an image feature representation received from a first portion of a machine-learned model with a top-down representation, inputting the concatenated representation into a second portion of the machine-learned model trained to predict object behavior, receiving a predicted behavior from the second portion of the machine-learned model, and controlling an autonomous vehicle based on the predicted behavior, in accordance with examples of the disclosure.

FIG. 6 depicts an example process 600 for concatenating, as a concatenated representation, an image feature representation received from a first portion of a machine-learned model with a top-down representation, inputting the concatenated representation into a second portion of the machine-learned model trained to predict object behavior, receiving a predicted behavior from the second portion of the machine-learned model, and controlling an autonomous vehicle based on the predicted behavior, in accordance with examples of the disclosure. For example, some or all of the process 600 can be performed by one or more components in FIG. 4, as described herein. For example, some or all of the process 600 can be performed by the vehicle computing device(s) 404, the computing device(s) 440, or any other computing device or combination of computing devices. Further, any of the operations described in the example process 600 may be executed in parallel, in a different order than depicted in the process 600, omitted, combined with the process 500, combined with other processes, and the like.

At operation 602, the process can include receiving an image depicting an object in an environment, and receiving additional sensor data. As discussed above, a camera may be included as a sensor on an autonomous vehicle traversing an environment. The camera may capture images of the surrounding environment as the autonomous vehicle traverses the environment. Additionally, sensors such as lidar sensors, radar sensors, time of flight sensors, and the like may be included on the autonomous vehicle, which capture corresponding types of additional sensor data as the autonomous vehicle traverses the environment.

At operation 604, the process can include inputting at least a portion of the image into a first portion of a machine-learned model trained to detect image features. As discussed above, the first portion of the machine-learned model may include an encoder and a decoder architecture. In some examples, the encoder may include a neural network encoder (e.g., a fully connected, convolutional, recurrent, etc.) that receives the image and outputs a tensor associated with an image feature of the image. The architecture may also include a neural network decoder (e.g., a same type of network as the encoder, in an opposite orientation) that receives the tensor output from the encoder and outputs an image feature representation in the form of a multi-channel image from a top-down perspective that incorporates various tensors for different image features with channels of the multi-channel image.

At operation 606, the process can include receiving, from the first portion of the machine-learned model, an image feature representation including the object. In examples, the image feature representation may include image features encoded into channels of the multi-channel image. The image features may be located in the image feature representation corresponding to a location of the feature from the top-down perspective of the environment.

At operation 608, the process can include (e.g., substantially simultaneously with the operations 604 and 606) generating a top-down representation of the environment based on the additional sensor data. In some examples, a top-down representation may be a multi-channel image with object information embedded in the top-down representation, where channels of the multi-channel image represent different top-down features of the object.

At operation 610, the process can include concatenating, as a concatenated representation, the image feature representation and the top-down representation. Concatenating the representations may comprise appending a channel from the image feature representation multi-channel image with a channel from the top-down multi-channel image. In some examples, a relative location in a channel of the image feature representation may correspond to a similar relative location in a channel of the top-down representation, such that channels from the same or similar locations in the representations (and thus the environment) are combined.

At operation 612, the process can include inputting the concatenated representation into a second portion of the machine-learned model trained to predict object behavior. At operation 614, the process can include receiving, from the second portion of the machine-learned model, a predicted behavior of the object. In examples, the second portion of the machine learned model may be trained to output data that can be used to generate one or more predicted trajectories. For example, the machine learned model can output coordinates (e.g., x-coordinates and y-coordinates) associated with the object (e.g., a third-party vehicle) at one or more times in the future (e.g., 1 second, 2 seconds, 3 seconds, etc.). In some examples, the machine learned model can output coordinates associated with the object as well as probability information associated with each coordinate. In some examples, the machine learning model can include a convolutional neural network (CNN), which may include one or more recurrent neural network (RNN) layers, such as, but not limited to, long short-term memory (LSTM) layers. In some examples, the machine learning model can output a heat map associated with prediction probabilities based on image features. In some examples, at least one predicted trajectory can be determined based at least in part on the heat map. While the process 600 describes using a first portion and a second portion of a machine-learned model (e.g., a single machine-learned model), examples are also considered in which multiple machine-learned models are used to execute the described functionality as well.

At operation 616, the process can include controlling an autonomous vehicle based at least in part on the predicted behavior. For example, the autonomous vehicle can determine an amount of overlap of a bounding box representing the autonomous vehicle and prediction probabilities associated with the object. In some examples, the autonomous vehicle can evaluate a candidate trajectory of the autonomous vehicle to determine an overlap between predicted future motion and the prediction probabilities determined based on supplementing top-down predictions with image features.

Example Clauses

A: A system comprising: one or more processors; and one or more computer-readable media storing instructions executable by the one or more processors, wherein the instructions, when executed, cause the system to perform operations comprising: receiving sensor data of an environment, the sensor data comprising image data; determining an object based at least in part on the sensor data; tracking a behavior of the object based at least in part on the sensor data; inputting the image data into a first portion of a machine-learned model; receiving, from the first portion of the machine-learned model, an image feature representation representing the object; receiving a top-down representation, the top-down representation representing the object; concatenate, as a concatenated representation, the image feature representation and the top-down feature representation; inputting the concatenated representation into a second portion of the machine-learned model; receiving, from the second portion of the machine-learned model, a predicted behavior of the object; and determining a difference between the predicted behavior of the object and the behavior of the object; and altering one or more parameters of one or more of the first portion or the second portion of the machine-learned model to minimize the difference.

B: The system of paragraph A, wherein tracking the behavior of the object is based at least in part on log data.

C: The system of paragraph B, wherein the log data comprises track information of the object, the track information comprising one or more of object positions, object velocities, object accelerations, or object yaw rates.

D: The system of any of claims A-C, the operations further comprising transmitting the machine-learned model to an autonomous vehicle to control the autonomous vehicle based at least in part on predicting object behavior using the machine-learned model.

E: The system of any of claims A-D, wherein the object is a vehicle, and the behavior of the vehicle comprises one or more of a stay-in-lane action, a turn action, or a lane change action.

F: The system of any of claims A-E, wherein the object is a pedestrian, and the behavior of the pedestrian comprises an entering-a-drivable-region action, a leaving-the-drivable-region action, or a non-moving action.

G: A method comprising: determining, based at least in part on sensor data from one or more sensors, a behavior of an object in an environment; receiving an image depicting the object in the environment; inputting at least a portion of the image into a first portion of a machine-learned model; receiving, from the first portion of the machine-learned model, a multi-channel representation of the at least the portion of the image; inputting the multi-channel representation into a second portion of the machine-learned model; receiving, from the second portion of the machine-learned model, a predicted behavior of the object; determining a difference between the predicted behavior of the object and the behavior of the object; and altering one or more parameters of the machine-learned model to minimize the difference.

H: The method of paragraph G, wherein the sensor data is received from log data which comprises previously generated sensor data, and wherein determining the behavior of the object comprises: receiving a portion of the log data associated with a time at which the image was captured; and determining, from the log data, the behavior.

I: The method of paragraph H, wherein the object is a vehicle and the log data comprises tracking information associated with the vehicle at the time the image was captured, and wherein the behavior is determined based at least in part on a trajectory of the vehicle indicated by the tracking information.

J: The method of paragraph H or I, wherein the object is a pedestrian and the log data comprises tracking information associated with the pedestrian at the time the image was captured, and wherein the behavior is determined based at least in part on a pose of the pedestrian indicated by the tracking information.

K: The method of any of claims G-J, wherein the machine-learned model comprises an encoder and a decoder.

L: The method of paragraph K, wherein the decoder comprises a network configured to generate channels of the multi-channel representation, and wherein at least one channel of the channels includes a tensor comprising information related to a feature of the object.

M: The method of any of claims G-L, wherein the image is a first image captured by a first camera and the multi-channel representation is a first multi-channel representation, the method further comprising: receiving a second image depicting the object, the second image captured by a second camera; inputting the second image into a third portion of the machine-learned model; receiving, from the third portion of the machine-learned model, a second multi-channel representation corresponding to the second image; and inputting the second multi-channel representation into the second portion of the machine-learned model, wherein the predicted behavior received from the second portion of the machine-learned model is further based on the second multi-channel representation.

N: The method of any of claims G-M, wherein the image is a first image captured at a first time and the multi-channel representation is a first multi-channel representation, the method further comprising: receiving a second image depicting the object, the second image captured at a second time prior to the first time; and inputting the second image into the first portion of the machine-learned model; receiving, from the first portion of the machine-learned model, a second multi-channel representation; and inputting the second multi-channel representation into the second portion of the machine-learned model, wherein the predicted behavior of the object is further based at least in part on the second multi-channel representation.

O: One or more computer-readable media storing instructions that, when executed by one or more processors, perform operations comprising: determining, based at least in part on sensor data from one or more sensors, a behavior of an object in an environment; receiving an image depicting the object in the environment; inputting at least a portion of the image into a first portion of a machine-learned model; receiving, from the first portion of the machine-learned model, a multi-channel representation of the at least the portion of the image; generating a top-down representation of the object in the environment based at least in part on the sensor data; inputting the multi-channel representation and the top-down representation into a second portion of the machine-learned model; receiving, from the second portion of the machine-learned model, a predicted behavior of the object; determining a difference between the predicted behavior of the object and the behavior of the object; and altering one or more parameters of one or more of the first portion or the second portion of the machine-learned model to minimize the difference.

P: The one or more computer-readable media of paragraph O, further comprising: concatenating, as a concatenated representation, the multi-channel representation and the top-down representation; and inputting the concatenated representation into the second portion of the machine-learned model, wherein the predicted behavior is further based on the concatenated representation.

Q: The one or more computer-readable media of paragraph O or P, wherein determining the behavior of the object is based at least in part on log data.

R: The one or more computer-readable media of paragraph Q, wherein the log data comprises track information of the object, the track information comprising one or more of object positions, object velocities, object accelerations, or object yaw rates.

S: The one or more computer-readable media of any of claims O-R, wherein the first portion of the machine-learned model comprises an encoder and a decoder.

T: The one or more computer-readable media of any of claims O-S, the operations further comprising transmitting the machine-learned model to an autonomous vehicle to control the autonomous vehicle based at least in part on predicting object behavior using the machine-learned model.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
     receiving sensor data of an environment, the sensor data comprising image data;
     determining an object based at least in part on the sensor data;
     tracking a behavior of the object based at least in part on the sensor data;
     inputting the image data into a first portion of a machine-learned model;
     receiving, from the first portion of the machine-learned model, an image feature representation representing the object;
     receiving a top-down representation, the top-down representation representing the object;
     concatenate, as a concatenated representation, the image feature representation and the top-down feature representation, wherein the concatenated representation comprises a multi-channel representation including a first feature identified in the image representation and a second feature identified in the top-down feature representation;
     inputting the concatenated representation into a second portion of the machine-learned model;
     receiving, from the second portion of the machine-learned model, a predicted behavior of the object; and
     determining a difference between the predicted behavior of the object and the behavior of the object; and
     altering one or more parameters of one or more of the first portion or the second portion of the machine-learned model to minimize the difference.

2. The system of claim 1, wherein tracking the behavior of the object is based at least in part on log data.

3. The system of claim 2, wherein the log data comprises track information of the object, the track information comprising one or more of object positions, object velocities, object accelerations, or object yaw rates.

4. The system of claim 1, the operations further comprising transmitting the machine-learned model to an autonomous vehicle to control the autonomous vehicle based at least in part on predicting object behavior using the machine-learned model.

5. The system of claim 1, wherein the object is a vehicle, and the behavior of the vehicle comprises one or more of a stay-in-lane action, a turn action, or a lane change action.

6. The system of claim 1, wherein the object is a pedestrian, and the behavior of the pedestrian comprises an entering-a-drivable-region action, a leaving-the-drivable-region action, or a non-moving action.

7. A method comprising:
   determining, based at least in part on sensor data from one or more sensors, a behavior of an object in an environment;
   receiving a first image depicting the object in the environment, the first image captured at a first time;
   receiving a second image depicting the object, the second image captured at a second time prior to the first time;
   inputting at least a portion of the first image into a first portion of a machine-learned model;
   inputting the second image into the first portion of the machine-learned model;
   receiving, from the first portion of the machine-learned model, a first multi-channel representation;
   receiving, from the first portion of the machine-learned model, a second multi-channel representation;
   inputting the first multi-channel representation into a second portion of the machine-learned model;
   inputting the second multi-channel representation into the second portion of the machine-learned model;
   receiving, from the second portion of the machine-learned model, a predicted behavior of the object;
   determining a difference between the predicted behavior of the object and the behavior of the object; and
   altering one or more parameters of the machine-learned model to minimize the difference.

8. The method of claim 7, wherein the sensor data is received from log data which comprises previously generated sensor data, and
   wherein determining the behavior of the object comprises:
     receiving a portion of the log data associated with the first time at which the first image was captured; and
     determining, from the log data, the behavior.

9. The method of claim 8, wherein the object is a vehicle and the log data comprises tracking information associated with the vehicle at the first time the first image was captured, and wherein the behavior is determined based at least in part on a trajectory of the vehicle indicated by the tracking information.

10. The method of claim 8, wherein the object is a pedestrian and the log data comprises tracking information associated with the pedestrian at the first time the first image was captured, and wherein the behavior is determined based at least in part on a pose of the pedestrian indicated by the tracking information.

11. The method of claim 7, wherein the machine-learned model comprises an encoder and a decoder.

12. The method of claim 11, wherein the decoder comprises a network configured to generate channels of the first multi-channel representation and the second multi-channel representation, and wherein at least one channel of the channels includes a tensor comprising information related to a feature of the object.

13. The method of claim 7, wherein the second image is captured by a second camera, the method further comprising;

inputting the second image into a third portion of the machine-learned model; and receiving, from the third portion of the machine-learned model, the second multi-channel representation corresponding to the second image.

14. One or more computer-readable media storing instructions that, when executed by one or more processors, perform operations comprising:

determining, based at least in part on sensor data from one or more sensors, a behavior of an object in an environment;

receiving a first image depicting the object in the environment;

inputting at least a portion of the first image into a first portion of a machine-learned model;

receiving a second image depicting the object, the second image being captured by a second camera;

receiving, from the first portion of the machine-learned model, a first multi-channel representation of the at least the portion of the image;

generating a top-down representation of the object in the environment based at least in part on the sensor data;

inputting the first multi-channel representation and the top-down representation into a second portion of the machine-learned model;

inputting the second image into a third portion of the machine-learned model;

receiving, from the third portion of the machine-learned model, a second multi-channel representation corresponding to the second image;

receiving, from the second portion of the machine-learned model, a predicted behavior of the object, wherein the predicted behavior is further based on the second multi-channel representation;

determining a difference between the predicted behavior of the object and the behavior of the object; and altering one or more parameters of one or more of the first portion or the second portion of the machine-learned model to minimize the difference.

15. The one or more computer-readable media of claim 14, further comprising:

concatenating, as a concatenated representation, the first multi-channel representation and the top-down representation; and inputting the concatenated representation into the second portion of the machine-learned model, wherein the predicted behavior is further based on the concatenated representation.

16. The one or more computer-readable media of claim 14, wherein determining the behavior of the object is based at least in part on log data.

17. The one or more computer-readable media of claim 16, wherein the log data comprises track information of the object, the track information comprising one or more of object positions, object velocities, object accelerations, or object yaw rates.

18. The one or more computer-readable media of claim 14, wherein the first portion of the machine-learned model comprises an encoder and a decoder.

19. The one or more computer-readable media of claim 14, the operations further comprising transmitting the machine-learned model to an autonomous vehicle to control the autonomous vehicle based at least in part on predicting object behavior using the machine-learned model.

* * * * *